(12) United States Patent
Matsumoto

(10) Patent No.: US 11,328,747 B1
(45) Date of Patent: May 10, 2022

(54) HEAT-ASSISTED MAGNETIC RECORDING (HAMR) HEAD WITH HEAT SINK MATERIAL ADJACENT THE WAVEGUIDE

(71) Applicant: Western Digital Technologies, Inc., San Jose, CA (US)

(72) Inventor: Takuya Matsumoto, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/172,244

(22) Filed: Feb. 10, 2021

Related U.S. Application Data

(60) Provisional application No. 63/122,827, filed on Dec. 8, 2020.

(51) Int. Cl.
| | |
|---|---|
| *G11B 11/105* | (2006.01) |
| *G11B 13/08* | (2006.01) |
| *G11B 5/00* | (2006.01) |
| *G11B 5/60* | (2006.01) |
| *G11B 5/48* | (2006.01) |

(52) U.S. Cl.
CPC ............ *G11B 13/08* (2013.01); *G11B 5/4866* (2013.01); *G11B 5/6088* (2013.01); *G11B 11/105* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,619,514 B1 | 12/2013 | Matsumoto | |
| 8,619,515 B1 | 12/2013 | Matsumoto | |
| 8,619,516 B1 | 12/2013 | Matsumoto | |
| 8,705,325 B2 | 4/2014 | Matsumoto | |
| 8,705,327 B2 | 4/2014 | Matsumoto | |
| 8,923,100 B1 | 12/2014 | Wessel et al. | |
| 9,147,427 B1 | 9/2015 | Lee et al. | |
| 9,218,835 B1 | 12/2015 | Sasaki et al. | |
| 9,251,830 B1* | 2/2016 | Duda | G11B 7/1387 |
| 9,431,036 B2 | 8/2016 | Vavra et al. | |
| 10,249,326 B1 | 4/2019 | Peng | |
| 10,748,572 B1 | 8/2020 | Yang et al. | |
| 10,770,098 B1 | 9/2020 | Peng | |
| 10,811,035 B1 | 10/2020 | Lee et al. | |
| 10,839,830 B1 | 11/2020 | Peng et al. | |
| 2012/0075965 A1* | 3/2012 | Tanaka | G11B 5/6088 369/13.33 |

(Continued)

*Primary Examiner* — Tan X Dinh
(74) *Attorney, Agent, or Firm* — Thomas R. Berthold

(57) ABSTRACT

A heat-assisted magnetic recording (HAMR) head has a gas-bearing slider that supports a near-field transducer (NFT) and a main magnetic pole. First heat-sink material is located on the cross-track sides of the main pole and second heat-sink material is located on the cross-track sides of the waveguide. The second heat-sink material may be in contact with the first heat-sink material, and a thermal shunt of high thermal conductivity may interconnect the NFT with the first and second heat-sink material. Heat from the NFT output tip flows to the second heat sink material through the NFT and the thermal shunt. Optically reflective material may be located between the waveguide and the second heat-sink material to improve the optical efficiency of the NFT.

29 Claims, 10 Drawing Sheets

(56) References Cited

U.S. PATENT DOCUMENTS

| | | | | |
|---|---|---|---|---|
| 2013/0071062 | A1* | 3/2013 | Peng | G11B 5/314 |
| | | | | 385/31 |
| 2015/0043316 | A1* | 2/2015 | Rea | G11B 13/08 |
| | | | | 369/13.33 |
| 2015/0325261 | A1* | 11/2015 | Yang | G11B 5/3133 |
| | | | | 369/13.33 |
| 2016/0125901 | A1* | 5/2016 | Lee | G11B 7/1387 |
| | | | | 369/13.33 |
| 2017/0249962 | A1* | 8/2017 | Peng | G11B 5/314 |
| 2017/0323659 | A1* | 11/2017 | Matsumoto | G11B 5/3116 |
| 2018/0096702 | A1* | 4/2018 | Staffaroni | G11B 5/3133 |
| 2019/0066725 | A1* | 2/2019 | Rajauria | G11B 13/08 |
| 2019/0378539 | A1 | 12/2019 | Matsumoto et al. | |
| 2021/0027808 | A1* | 1/2021 | Matsumoto | G11B 5/3133 |

* cited by examiner

HEAT-ASSISTED MAGNETIC RECORDING (HAMR) HEAD WITH HEAT SINK MATERIAL ADJACENT THE WAVEGUIDE

TECHNICAL FIELD

This invention relates generally to a heat-assisted magnetic recording (HAMR) disk drive, in which data are written while the magnetic recording layer on the disk is at an elevated temperature, and more specifically to an improved HAMR head.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing by the main magnetic pole to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a near-field transducer (NFT) for heating the recording material on the disk. A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the gas-bearing surface (GBS) of the gas-bearing slider that also supports the read/write head and rides or "flies" above the disk surface.

A NFT with a generally triangular or trapezoidal shaped output end is described in U.S. Pat. No. 8,705,327 B2. In this NFT an evanescent wave generated at a surface of the waveguide couples to surface plasmons excited on the surface of the NFT and a strong optical near-field is generated at the apex of the output end.

SUMMARY

In conventional HAMR heads the heat from the NFT causes a deformation of the NFT. The heat can also cause a temperature rise in the main magnetic pole. This increases the likelihood of undesirable oxidization of the main pole at the GBS, which is also influenced by wear of the head protective overcoat. For improving head reliability, it is desirable to minimize deformation of the NFT and oxidation of the main pole by minimizing heating of the NFT and the main pole. This will also reduce the thermal protrusion of NFT caused by the heat from the NFT. It is also desirable to improve the optical efficiency so the waveguide mode is efficiently converted to the optical near-field and light is more confined at the apex of the NFT. This will improve the thermal gradient in the recording layer to increase the areal density, and lower the laser power to reduce the power consumption of the laser.

In embodiments of this invention, first heat-sink material may be located on the cross-track sides of the main pole and additional heat-sink material is located on the cross-track sides of the waveguide. The additional or second heat-sink material further reduces the temperature of the NFT, and thus the likelihood of NFT deformation. The second heat-sink is in contact with the NFT and thermal shunt so the heat from the NFT output tip flows to the second heat sink material through the NFT and the thermal shunt. It reduces the temperature of the NFT and thus the likelihood of NFT deformation. The second heat sink is optionally connected to the first heat-sink material on the cross-track sides of the main pole to further reduce the temperature of the NFT. It can also reduce the temperature of the main pole and thus the likelihood of oxidation of the main pole. In some embodiments, optically reflective material may be located between the waveguide and the second heat-sink material to improve the optical efficiency of the NFT.

For a fuller understanding of the nature and advantages of the present invention, reference should be made to the following detailed description taken together with the accompanying figures.

DETAILED DESCRIPTION

Figure 1:
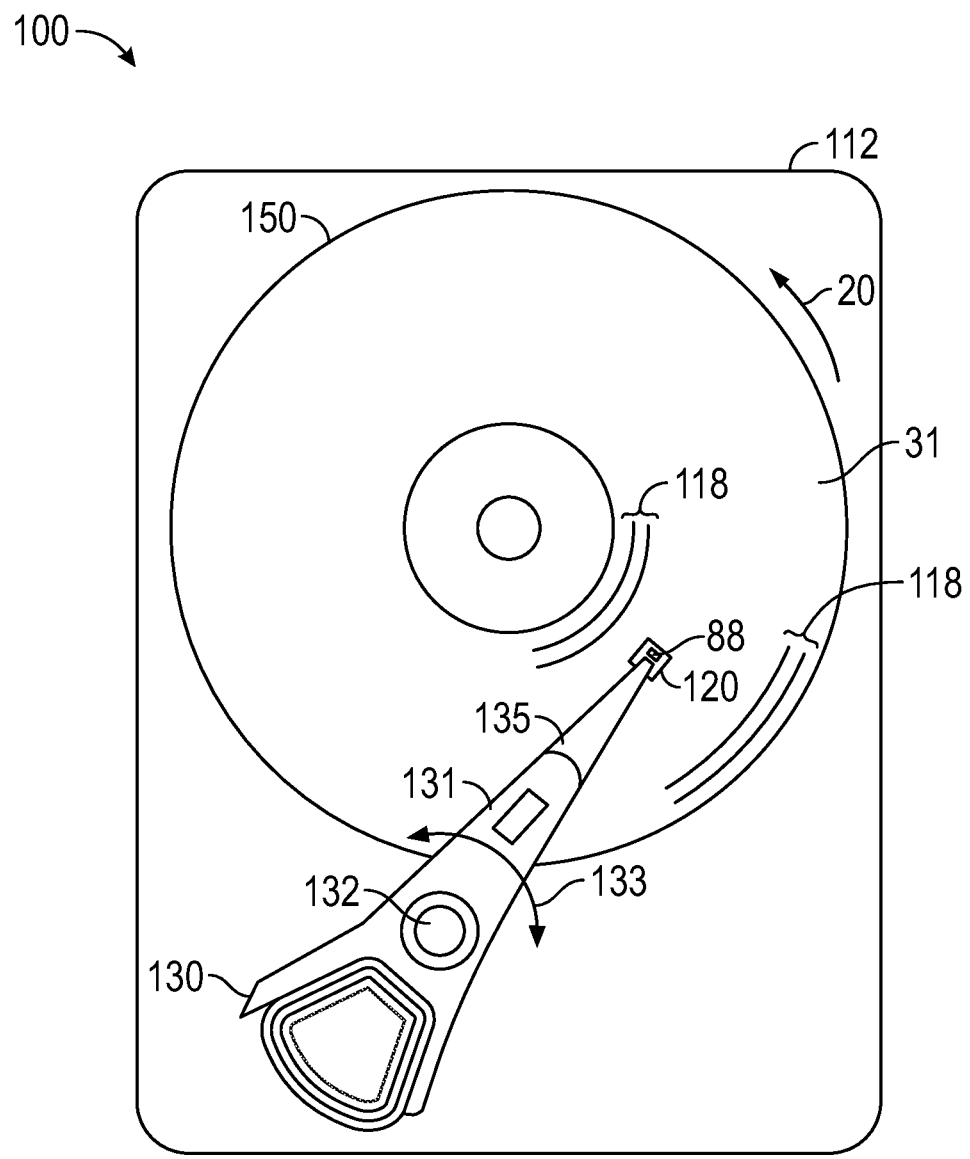
FIG. 1 is a top view of a heat-assisted magnetic recording (HAMR) disk drive according to an embodiment of the invention.

FIG. 1 is a top view of a heat-assisted recording (HAMR) disk drive 100 according to an embodiment of the invention. In FIG. 1, the HAMR disk drive 100 is depicted with a disk 150 with magnetic recording layer 31 of conventional continuous magnetic recording material arranged in radially-spaced circular tracks 118. Only a few representative tracks 118 near the inner and outer diameters of disk 150 are shown. However, instead of a conventional continuous magnetic recording layer, the recording layer may be a bit-patterned-media (BPM) layer with discrete data islands.

The drive 100 has a housing or base 112 that supports an actuator 130 and a drive motor for rotating the magnetic recording disk 150. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 150 and enables it to "pitch" and "roll" on the bearing of gas (typically air or helium) generated by the disk 150 as it rotates in the direction of arrow 20. The slider 120 supports the HAMR head (not shown), which includes a magnetoresistive read head, an inductive write head, the near-field transducer (NFT) and optical waveguide. A semiconductor laser 88 with a wavelength of 780 to 980 nm may used as the HAMR light source and is depicted as being supported on the top of slider 120. Alternatively the laser may be located on suspension 135 and coupled to slider 120 by an optical channel. As the disk 150 rotates in the direction of arrow 20, the movement of actuator 130 allows the HAMR head on the slider 120 to access different data tracks 118 on disk 150. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
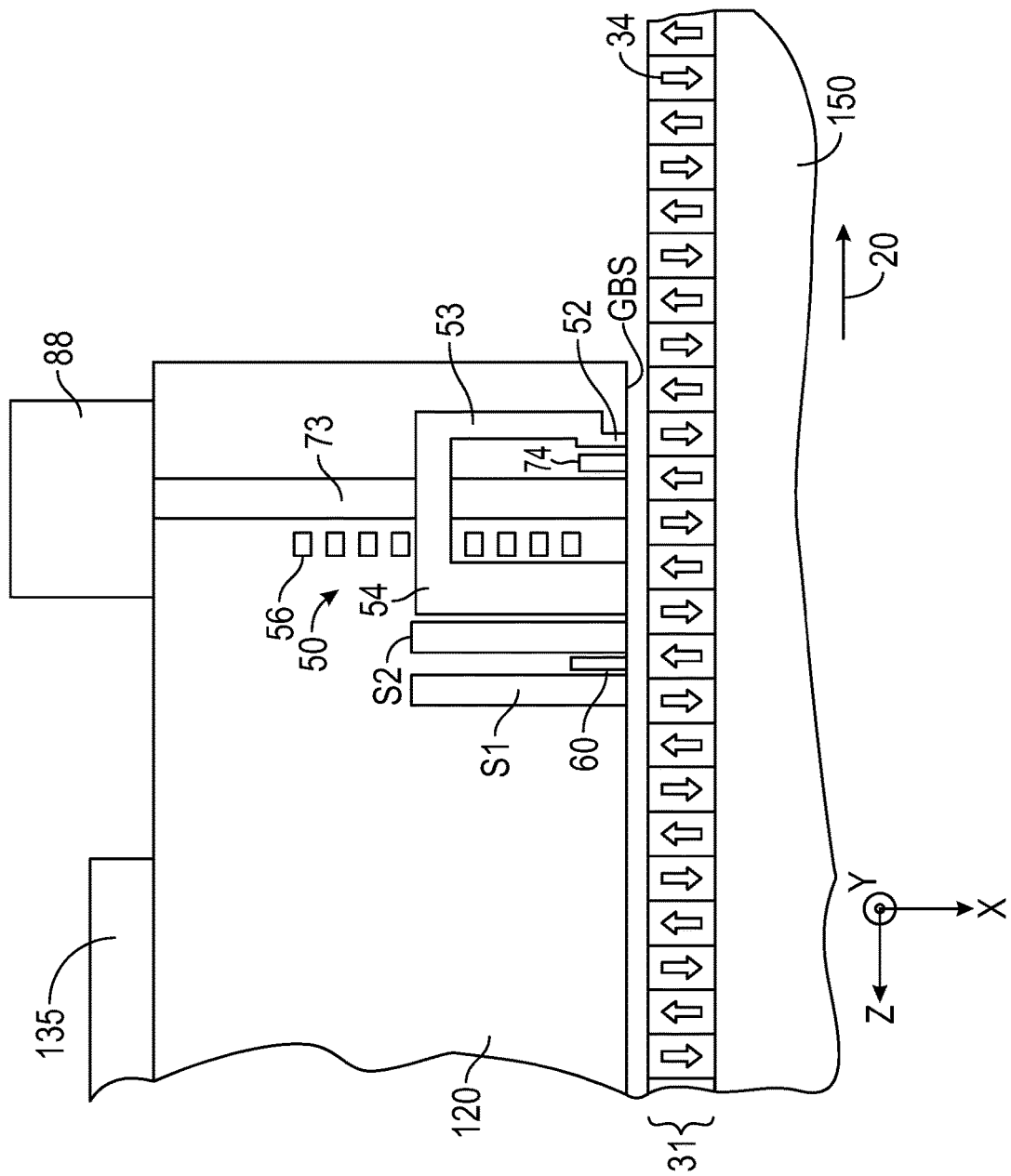
FIG. 2 is a side a sectional view, not drawn to scale because of the difficulty in showing the very small features, of a gas-bearing slider for use in a HAMR disk drive and a portion of a HAMR disk according to the prior art.

In the following drawings, the X-axis denotes an axis perpendicular to the gas-bearing surface (GBS) of the slider, the Y-axis denotes a track width or cross-track axis, and the Z-axis denotes an along-the-track axis. FIG. 2 is a schematic cross-sectional view illustrating a configuration example of a HAMR head according to the prior art. In FIG. 2, the disk 150 is depicted with the recording layer 31 being a conventional continuous magnetic recording layer of magnetizable material with magnetized regions or "bits" 34. The gas-bearing slider 120 is supported by suspension 135 and has a GBS that faces the disk 150 and supports the magnetic write head 50, read head 60, and magnetically permeable read head shields S1 and S2. A recording magnetic field is generated by the write head 50 made up of a coil 56, a primary magnetic pole 53 for transmitting flux generated by the coil 56, a main pole 52 connected to the primary pole 53, and a return magnetic pole 54 coupled to the primary pole 53 and main pole 52. A magnetic field generated by the coil 56 is transmitted through the primary pole 53 to the main pole 52 arranged in a vicinity of an optical near-field transducer (NFT) 74. FIG. 2 illustrates the write head 50 with a well-known "pancake" coil 56, wherein the coil segments lie in substantially the same plane. However, alternatively the coil may be a well-known "helical" coil wherein the coil is wrapped around the primary magnetic pole 53. At the moment of recording, the recording layer 31 of disk 150 is heated by an optical near-field generated by the NFT 74 and, at the same time, a region or "bit" 34 is magnetized and thus written onto the recording layer 31 by applying a recording magnetic field generated by the main pole 52.

A semiconductor laser 88 is mounted to the top surface of slider 120. An optical waveguide 73 for guiding light from laser 88 to the NFT 74 is formed inside the slider 120. Materials that ensure a refractive index of the waveguide 73 core material to be greater than a refractive index of the surrounding cladding material (not shown) may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $Nb_2O_5$, $SiO_xN_y$, or Ge-doped $SiO_2$ as the core material. The waveguide 73 that delivers light to NFT 74 is preferably a single-mode waveguide.

Figure 3A:
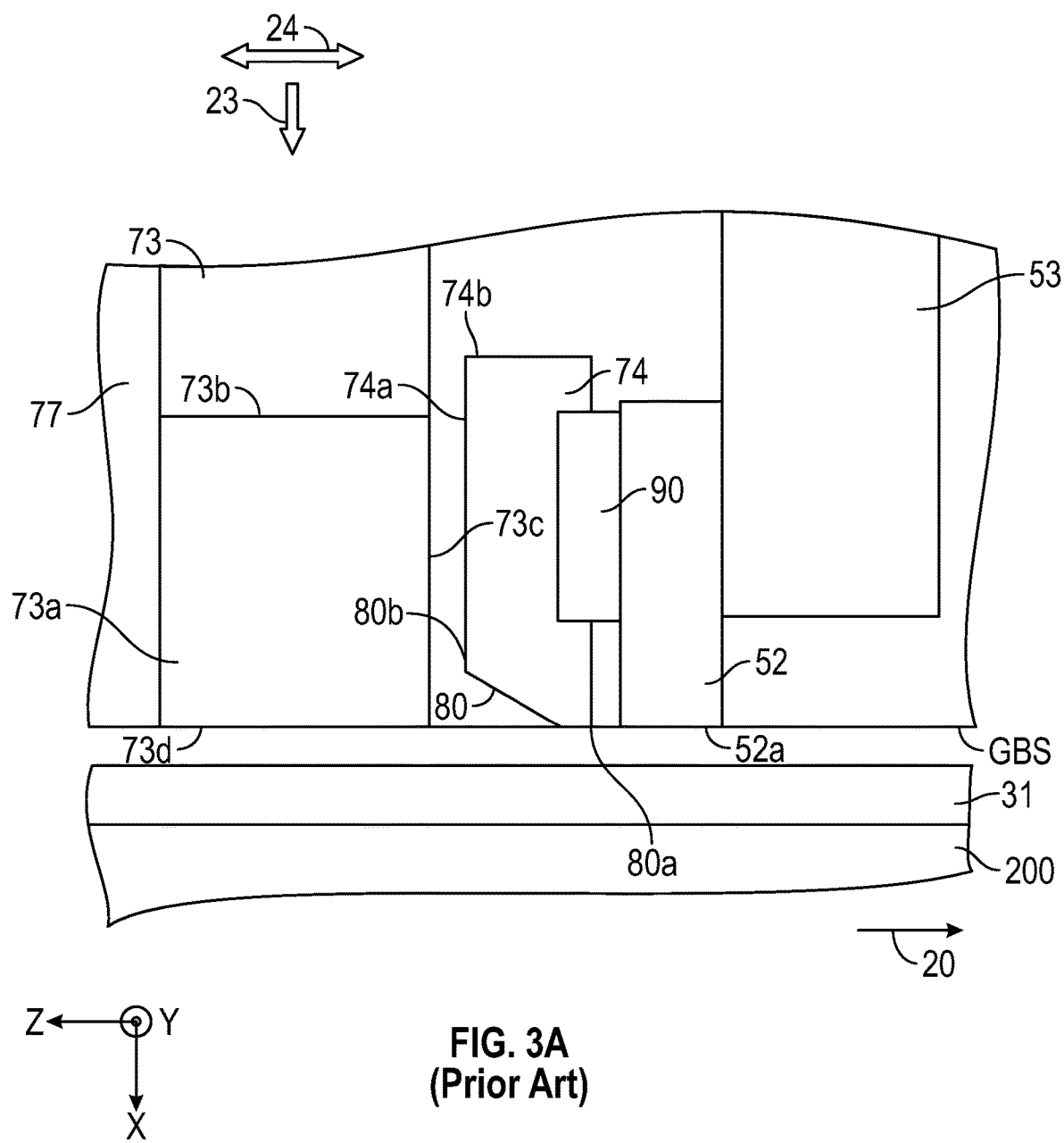
FIG. 3A is a side sectional view of the layers of material making up the main pole and primary pole, the near-field transducer (NFT) and the waveguide according to the prior art and shown in relation to the recording layer on the disk.

FIG. 3A is a side sectional view of a prior art HAMR head and shows the layers of material making up the primary pole 53, main pole 52, NFT 74 and waveguide 73 and shown in relation to disk 150 with recording layer 31. The main pole 52 is typically a layer of high-moment material like FeCo and has a pole tip 52a at the GBS. The waveguide 73 is a layer of core material generally parallel to the main pole 52 layer with a length orthogonal to the GBS and may have a tapered portion 73a extending from a region 73b recessed from the GBS to the waveguide end 73d at the GBS. The waveguide 73 has surrounding cladding material 77 and a generally planar surface 73c that faces and is parallel to NFT 74 layer. The NFT 74 layer is a conductive low-loss metal (preferably Au, but also Ag, Al, Cu, Rh, Ir or their alloys), is generally parallel to waveguide 73 layer and main pole 52 layer, and is located between and spaced from the waveguide 73 layer and the main pole 52 layer. The NFT 74 layer has a surface 74a that faces and is spaced from waveguide surface 73c. The NFT 74 layer has an output tip 80 at the GBS. When light is introduced into the waveguide 73, an evanescent wave is generated at the surface 73c and couples to a surface plasmon excited on the surface 74a of NFT 74. Arrow 23 shows the direction of propagation of light in waveguide 73 and arrow 24 shows the direction of polarization of the light. The surface plasmon propagates to the output tip 80. The output tip 80 has an apex 80a that faces the main pole tip 52a and a back edge 80b that faces the waveguide surface 73c. At the apex 80a an optical near-field spot is generated in the space at the GBS between the output tip apex 80a and the main pole tip 52a. The main pole tip 52a applies a magnetic field at the optical spot. A thermal shunt 90 of material with high thermal conductivity like Au, Ag or Cu may be located between NFT 74 and main pole 52 to allow heat to be transferred from the optical spot to heat-sink material located on the cross-track sides of main pole 52. A thermal shunt is described in U.S. Pat. No. 8,619,516 B1.

Figure 3B:
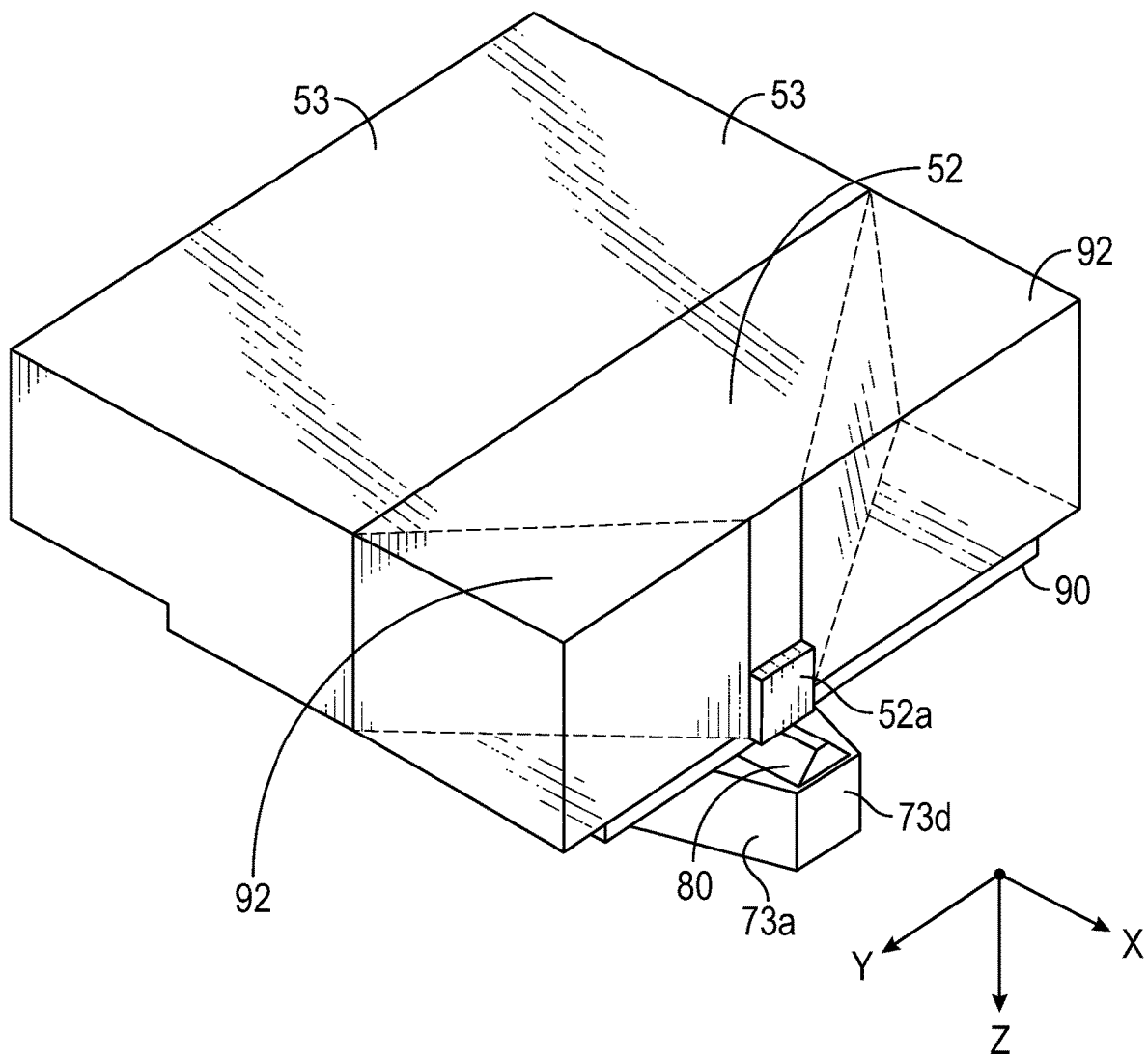
FIG. 3B is a perspective view of the main pole, primary pole, NFT, tapered waveguide and heat-sink material on the cross-track sides of the main pole according to the prior art.
Figure 3C:
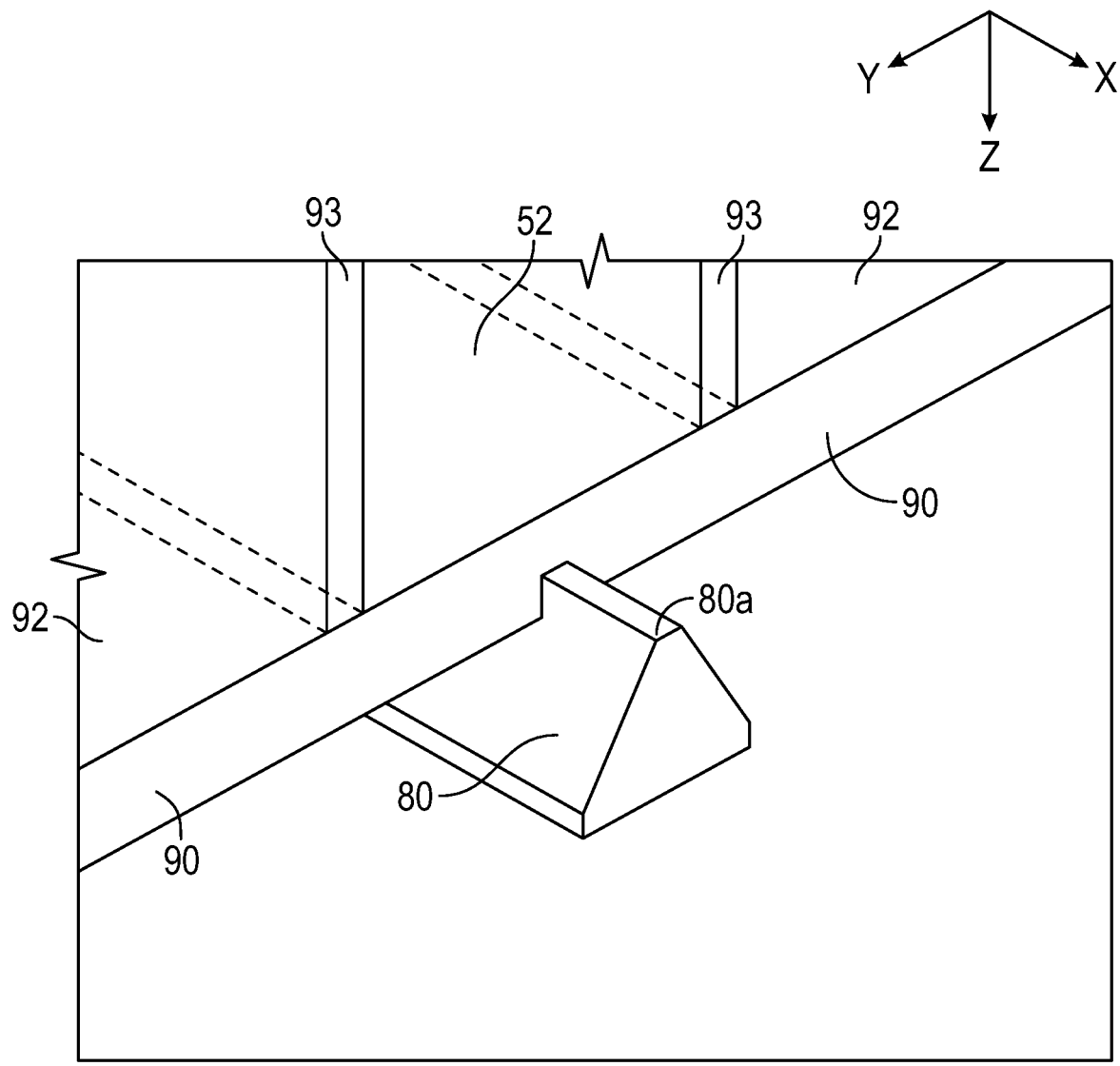
FIG. 3C is an enlarged perspective view of a portion of FIG. 3B showing the connection of the thermal shunt with the NFT output tip with the heat-sink material on the cross-track sides of the main pole according to the prior art.

FIG. 3B is a perspective view of a prior art HAMR head and shows heat-sink material 92 in contact with thermal shunt 90, as well as the primary pole 53, the main pole 52, the NFT output tip 80 and the waveguide end 73d. FIG. 3C is an enlarged perspective view showing the connection of the thermal shunt 90 with NFT output tip 80 and heat-sink material 92 on the cross-track sides of main pole 52. If the heat-sink material 92 includes an element that may diffuse into the magnetic material of main pole 52, like Au or Cu, then a diffusion barrier layer 93 is located between main pole 52 and the heat-sink material 92. The material of diffusion layer 93 may be, for example, Rh, Ru, In, Co, W, Rh oxide, Ru oxide, Indium oxide, or TiN, with a thickness preferably in the range of 5-10 nm. If the heat-sink material 92 is selected from a material that is not likely to diffuse into the main pole 52, like Ru or Rh, then the diffusion layer 93 is not required.

Figure 4A:
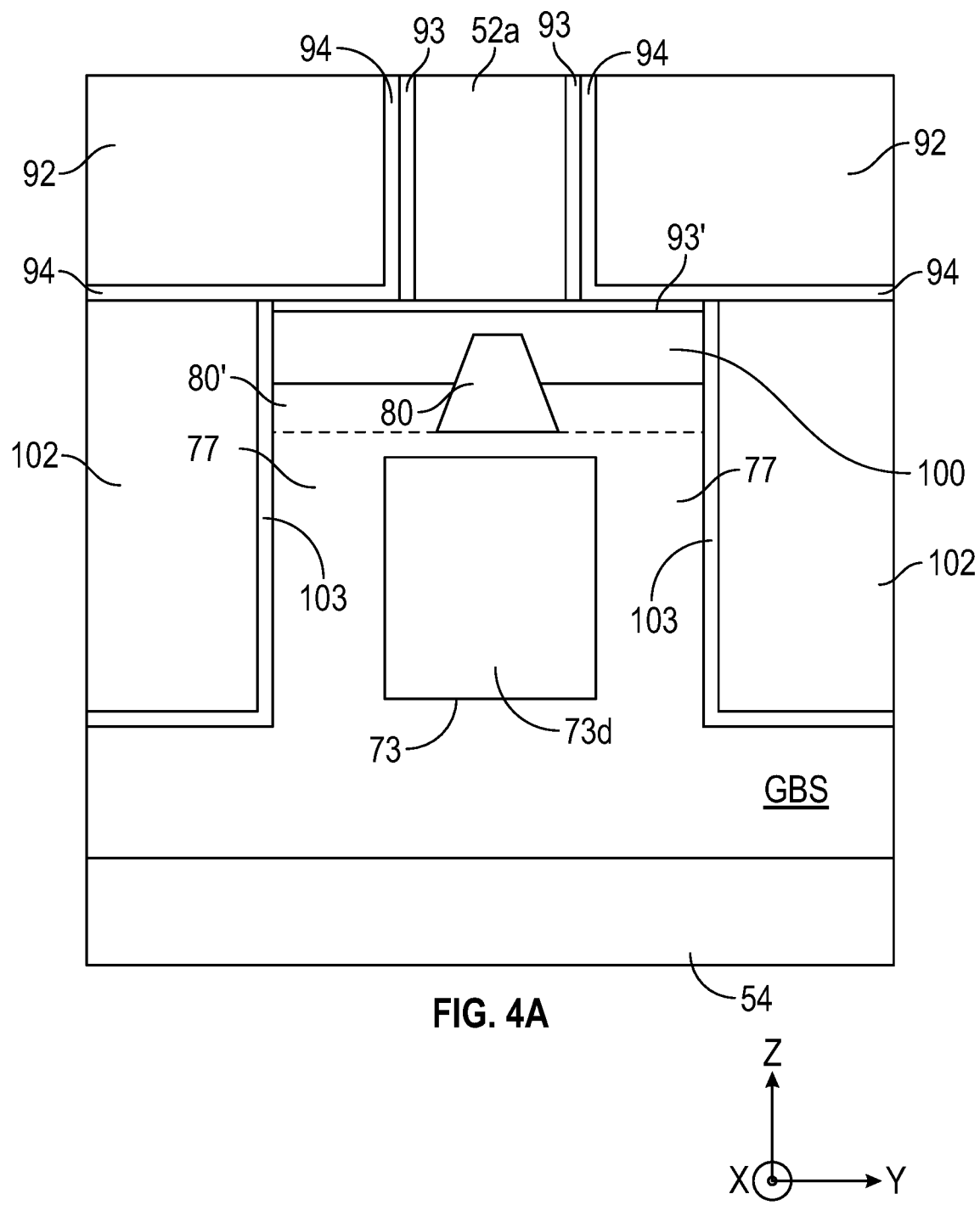
FIG. 4A is a gas bearing surface (GBS) view of an embodiment of the invention and shows second heat-sink material located on the cross-track sides of the waveguide.

In embodiments of this invention, additional or second heat-sink material is located on the cross-track sides of the waveguide. The second heat sink is in contact with the NFT and thermal shunt so the heat from the NFT output tip flows to the second heat sink material through the NFT and the thermal shunt. It reduces the temperature of the NFT and thus the likelihood of NFT deformation. The second heat sink is optionally connected to the first heat-sink material on the cross-track sides of the main pole to further reduce the temperature of the NFT. It can also reduce the temperature of the main pole and thus the likelihood of oxidation of the main pole. FIG. 4A is a GBS view of an embodiment of the invention and shows second heat-sink material 102 located on the cross-track sides of the waveguide 73 with end 73d. Waveguide cladding material 77 is located between waveguide 73 and second heat-sink material 102. A seed layer 103 may be deposited before the formation of heat-sink material 102. In the embodiment of FIG. 4A, an optional thermal shunt 100 is substantially in contact with both first heat-sink material 92, which is adjacent the cross-track sides of main pole 52 with end 52a, and second heat-sink material 102, either directly or through seed layers 94, 103. A diffusion barrier layer 93' is located between thermal shunt 100 and first heat-sink material 92 and main pole 52 with end 52a. The second heat-sink material 102 may also be substantially in contact with first heat-sink material 92, either directly or through seed layer 94. The first and second heat-sink material 92 and 102 may be formed of any material with a thermal conductivity larger than that of alumina, for example Cu, Au, Ag, Al, W, Ru, Cr, SiN, AlN, TiC, SiC, Be, Fe, FeCo, or NiFe: but it is preferable to use material with a high thermal conductivity, such as Cu or Au. The first heat-sink material 92 adjacent the main pole 52 with end 52a may be formed of Cr and the second heat-sink material 102 may be formed of Cu. The preferred thickness of heat-sink material 102 is between about 300 to 1000 nm, but it can be smaller than 300 nm or greater than 1000 nm. A thicker heat-sink is better for reducing the NFT temperature. For plating the heat sink material 102, the seed layer 103 may be Ru, Au or Cu, and can be one or more layers. The thickness of the seed layer 103 is preferably in the range of 5 to 30 nm. But the seed layer can be larger than 30 nm at the GBS, for example 100 to 500 nm. For example, the thickness can be increased at the GBS to avoid exposing the heat sink material at the GBS during the lapping process when the heads are manufactured. Also, it is possible to use a different seed layer material at the GBS. For example, Ru can be used for the seed layer adjacent the sides of the waveguide and Cr can be used for the seed layer near the GBS. The second heat-sink material 102 is described as an additional heat-sink together with first heat-sink material 92, but in some embodiments of this invention the heat-sink material 102 will work even without the first heat-sink material 92 on the side of the main pole. In FIG. 4A the second heat-sink material 102 is adjacent the cross-track sides of both the waveguide 73 and the NFT 80 (which is part of wider NFT layer 80'), but it can alternatively be adjacent just the cross-track sides of the waveguide 73 and thus located below (in the Z-direction) and thus in contact with either the NFT layer 80' or the thermal shunt 100. In the embodiment of FIG. 4A the heat-sink material 102 is adjacent both the NFT output tip 80 and waveguide end 73d but does not extend in the along-the-track Z direction to return pole 54.

Figure 4B:
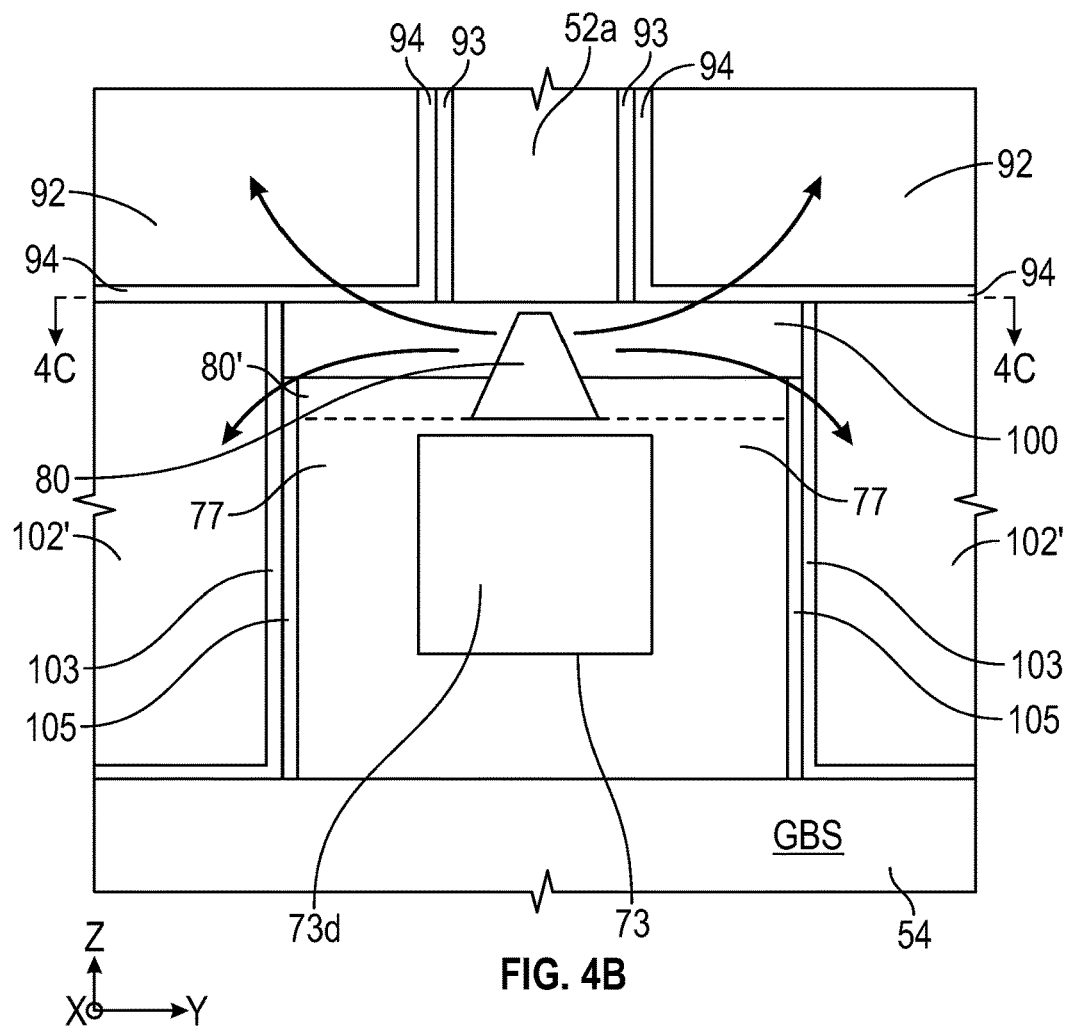
FIG. 4B is a gas bearing surface (GBS) view of an embodiment of the invention and shows second heat-sink material located on the cross-track sides of the waveguide and extending into contact with the return pole.

FIG. 4B is a GBS view of another embodiment of the invention and shows second heat-sink material 102' located on the cross-track sides of the waveguide with end 73d but also extending substantially into contact with return pole 54, either directly or through seed layer 103. The arrows represent the heat flow from the NFT output tip 80 through optional conductive thermal shunt 100 and/or the NFT layer 80' to both first heat-sink material 92 adjacent the main pole with end 52a and the second heat-sink material 102' adjacent the waveguide with end 73d. FIG. 4B also shows an optional aspect of embodiments of the invention in optical reflective layer 105 adjacent the cross-track sides of waveguide 73 with end 73d. Layer 105 reflects light from waveguide 73 back to the NFT output tip 80 and improves the optical efficiency. Layer 105 can be formed of high optically reflective material like Au, Rh, Ir, Cu, Ru, Pd, Cr, Pt and Ag and their alloys with a thickness in the range of about 10 to 100 nm.

Figure 4C:
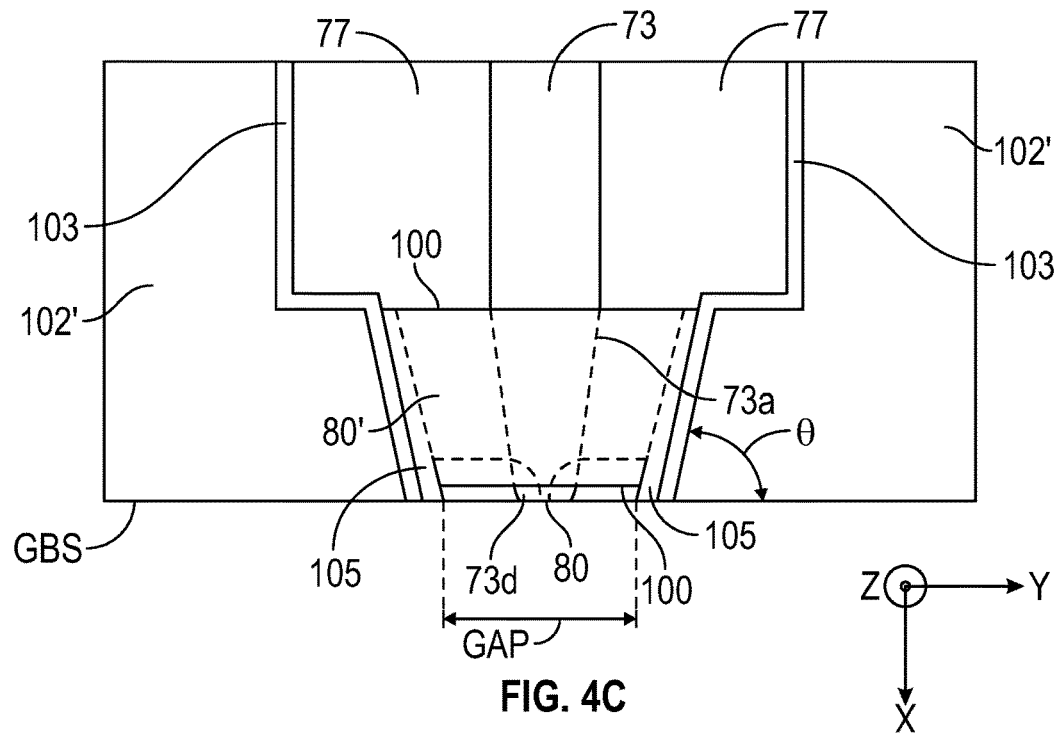
FIG. 4C is a view of section 4C-4C which is a X-Y plane of FIG. 4B and shows the tapered waveguide with overlying thermal shunt.

FIG. 4C is a view of section 4C-4C which is a X-Y plane of FIG. 4B and shows the tapered waveguide 73 that tapers down to waveguide end 73d and overlying thermal shunt 100. FIG. 4C also shows the cross-track gap width at the GBS between the two side reflective layers 105. By optimizing the gap width, the light is more efficiently confined at the apex of the NFT, and as a consequence, the required laser power and the NFT temperature can be reduced and the thermal gradient in the recording layer can be improved. The preferred gap width is between approximately 400 and 1200 nm. The optimal gap width depends on the refractive index of the waveguide core and cladding and the NFT design, as well as the corner angle θ between the reflective layer 105 and the GBS. When 0 is approximately 70 deg. the optimal gap width is approximately 600 nm. The corner angle is preferably between 45 and 90 deg.

Figure 4D:
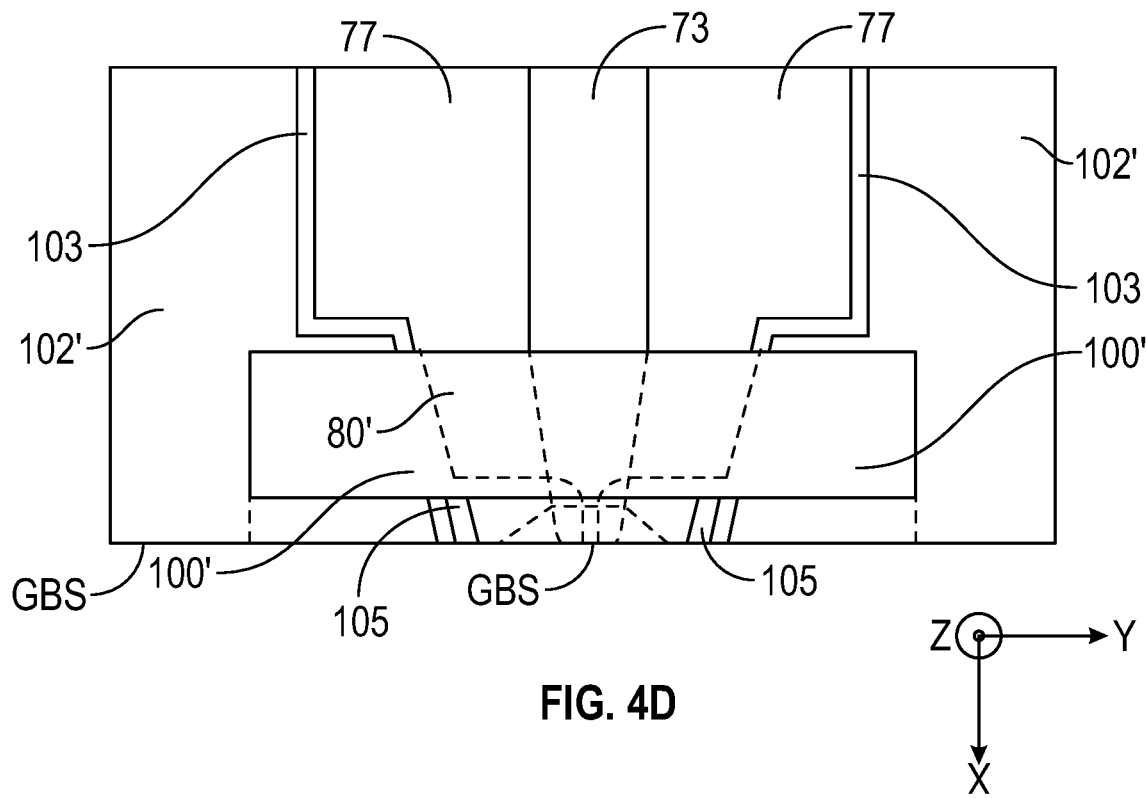
FIG. 4D is a section view which is an X-Y plane and shows an embodiment of the invention with a modification to the thermal shunt.

FIG. 4D is a section view like FIG. 4C and shows a modification to thermal shunt 100. Referring to FIG. 4A, the thermal shunt 100 can be truncated at the edge of seed layers 103 (or in direct contact with the heat-sink material 102 if seed layers are not formed at the edges of thermal shunt 100) so that the cross-track ends abut the second heat-sink material 102. Alternatively the thickness of seed layers 103 can be made as thin as possible, for example 10-20 nm, so the seed layers 103 do not block the heat flow from the NFT through the thermal shunt 100 to the side heat-sink material 102. In FIG. 4D, the thermal shunt 100' cross-track ends overlap and are in direct contact with side heat-sink material 102' so that the heat flow is not blocked by the seed layers 103. The height (X direction) of thermal shunt 100' can be increased if it is necessary to increase the heat flow from the NFT to the side heat-sink material 102'. In some embodiments the NFT layer 80' may also extend in the cross-track direction to overlap with second heat-sink material 102. FIG. 4D also shows that the thermal shunt 100' can be extended to have an edge at the GBS so that heat can also flow to the GBS and the NFT temperature is further reduced.

Figure 4E:
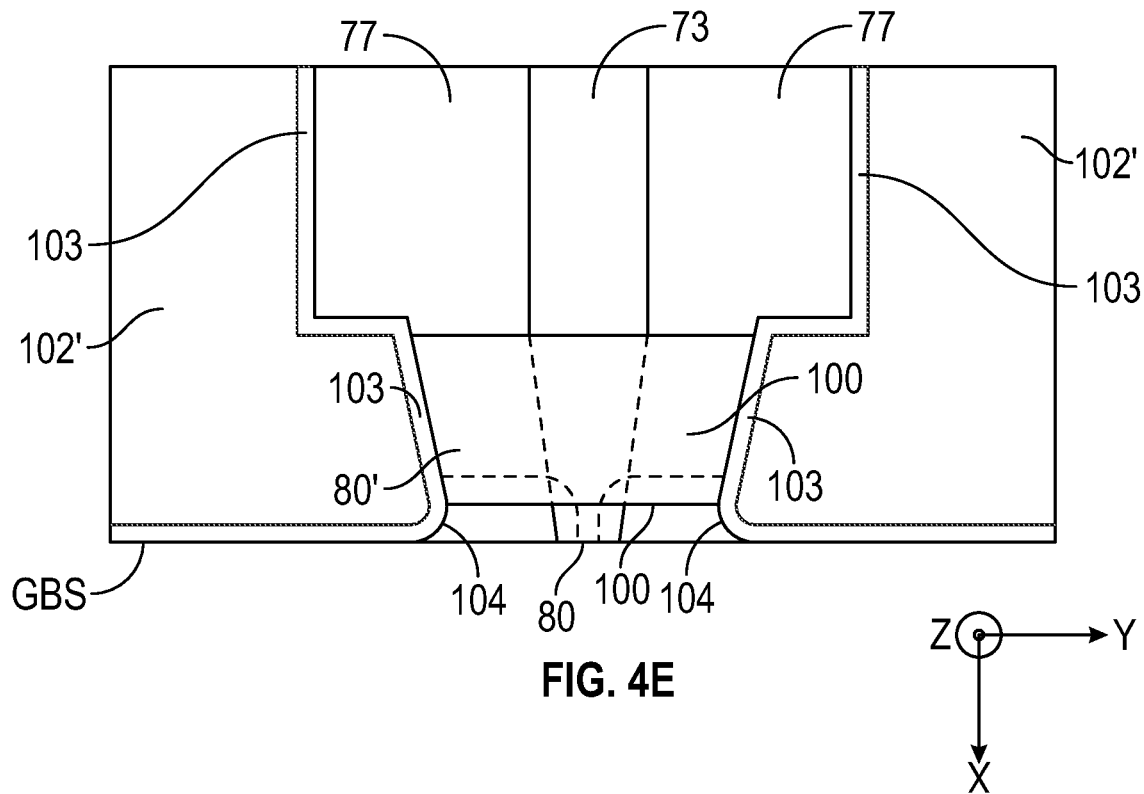
FIG. 4E is a section view which is an X-Y plane and shows an embodiment of the invention with a modification of the side heat-sink layers at the GBS.

FIG. 4E is a section view like FIG. 4C and shows an optional modification wherein the side heat-sink layers 102' at the GBS form rounded corners. The corners 104 between the seed layer 103 (and thus also the heat-sink material 102')

at the sides of the waveguide 73 and the seed layer 103 (and thus also the heat-sink material 102') at the GBS can be rounded at the GBS.

Figure 4F:
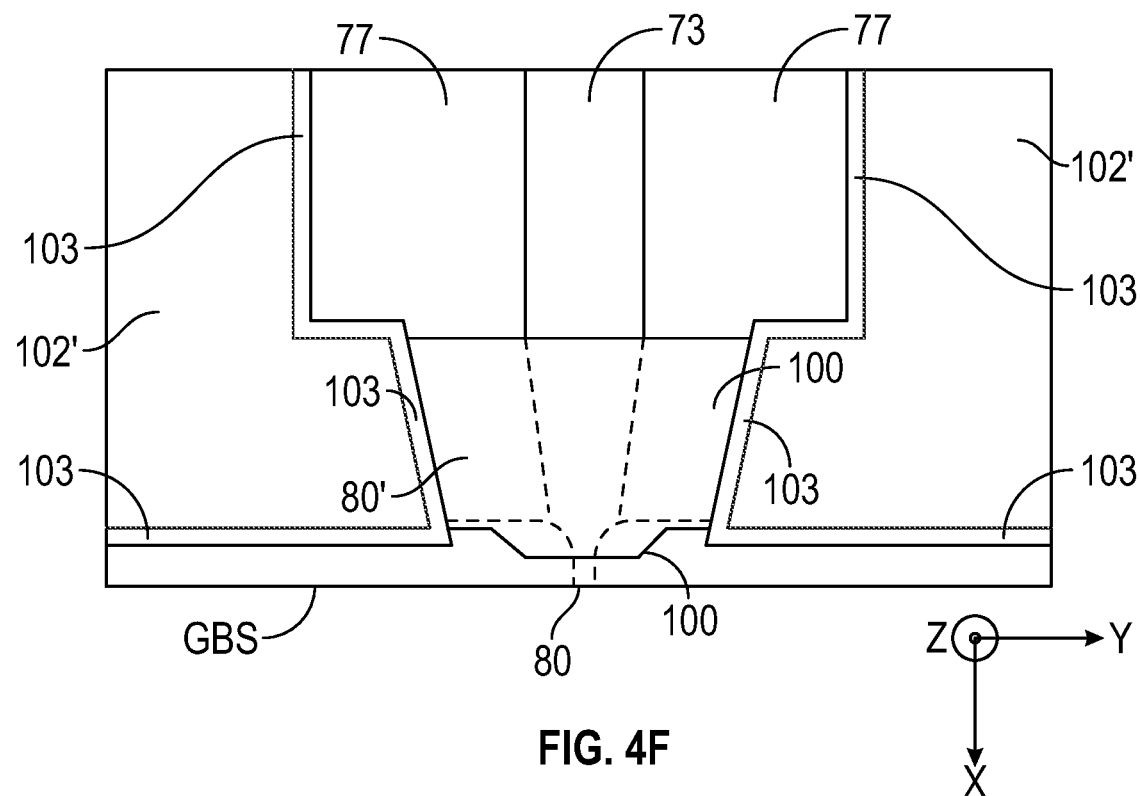
FIG. 4F is a section view which is an X-Y plane and shows an embodiment of the invention with the side heat-sink layers recessed from the GBS.

FIG. 4F is a section view like FIG. 4C and shows a modification where the side heat-sink material 102' and corresponding seed layers 103 are recessed from the GBS. This will avoid exposure of the heat-sink material 102' and seed layers 103 at the GBS in the lapping process during head manufacturing.

Figure 5:
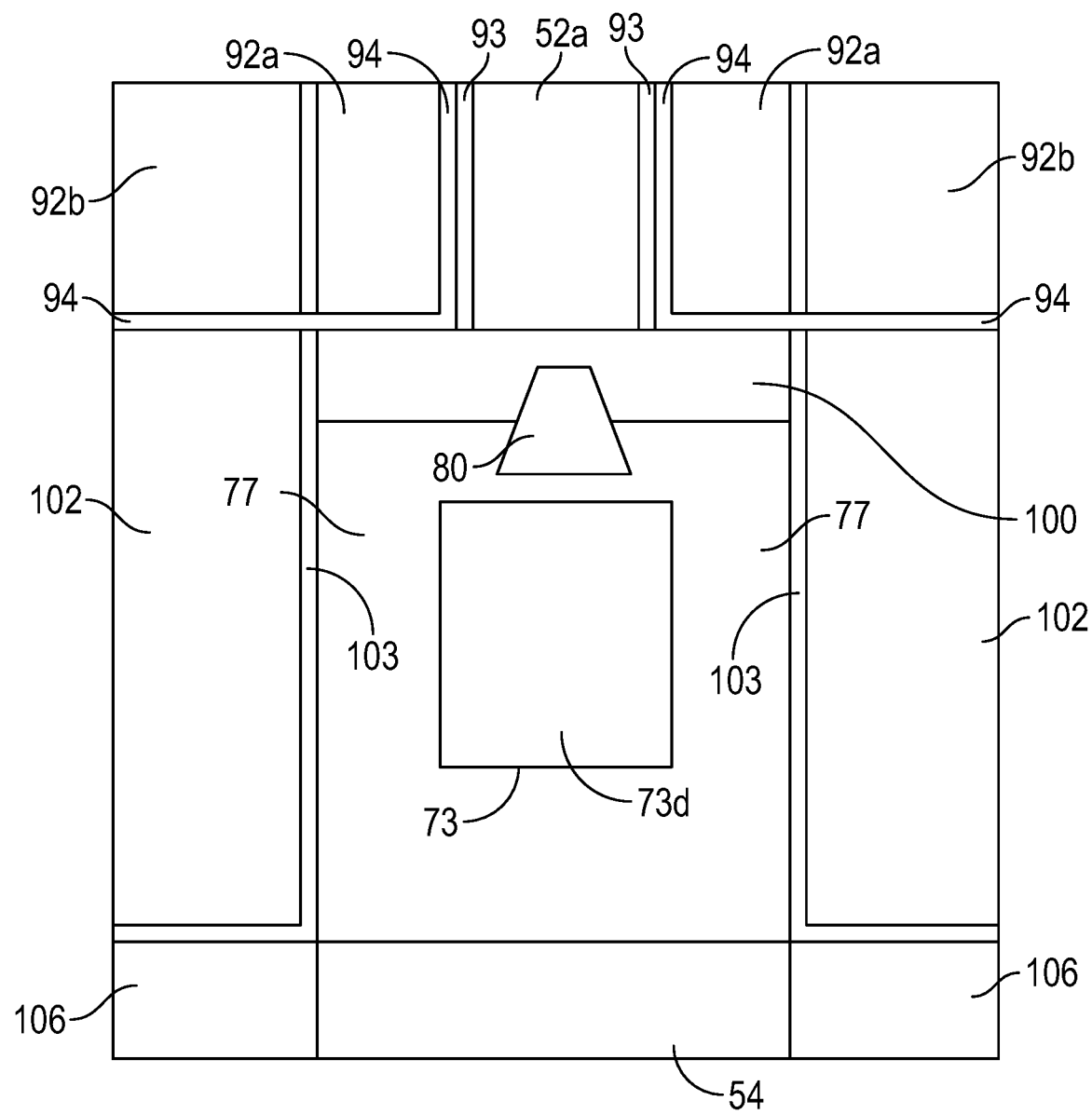
FIG. 5 is a GBS view of an embodiment of the invention with two optional features.

FIG. 5 is a GBS view of an embodiment of the invention that shows two optional features. The first heat-sink material adjacent the main pole 52 with end 52a may include at least two different types of heat-sink material. Heat-sink layers 92a directly adjacent the sides of the main pole may be formed of Cr and heat-sink layers 92b adjacent layers 92a and substantially in contact with second heat-sink material 102 may be formed of another material like Cu. FIG. 5 also shows optional third heat-sink material 106 adjacent the return pole 54 (on the cross-track or Y-direction sides of return pole 54) and substantially in contact with second heat-sink material 102. Alternatively the third heat-sink material may be adjacent the return pole 54 by being recessed from the GBS on the other side of the return pole 54 in the X-direction. With the use of the third heat-sink material adjacent the return pole 54 (in the Y or X directions) and second heat-sink material 102 adjacent the waveguide 73 it may be possible to reduce the head temperature enough without the need for the first heat-sink material adjacent the main pole.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer comprising:
   a head carrier having an along-the-track axis and a cross-track axis substantially orthogonal to the along-the-track axis;
   a main pole on a surface substantially orthogonal to the recording-layer-facing surface and having an output end substantially at the recording-layer-facing surface;
   a near-field transducer (NFT) layer on the head carrier oriented substantially parallel to the main pole, the NFT layer having an output tip at the recording-layer-facing surface aligned with the main pole output end in the along-the-track direction;
   an optical waveguide on the head carrier for optical coupling with the NFT layer, the waveguide having a core, a length generally orthogonal to the recording-layer-facing surface and an end facing the recording-layer-facing surface;
   heat-sink material adjacent the cross-track sides of the waveguide core; and optically reflective material adjacent each side of the cross-track sides of the waveguide end between the waveguide end and the heat-sink material.

2. The HAMR head of claim 1 further comprising seed layer material between the waveguide core and the heat-sink material.

3. The HAMR head of claim 1 wherein the cross-track gap width between the optically reflective material adjacent the sides of the waveguide end at the recording-layer-facing surface is between about 400 and 1200 nm.

4. The HAMR head of claim 1 wherein the optically reflective material is selected from one or more of Au, Rh, Ir, Cu, Ru, Pd, Cr and Ag.

5. The HAMR head of claim 1 further comprising waveguide cladding material between the waveguide end and the heat-sink material.

6. The HAMR head of claim 1 further comprising a thermal shunt interconnecting the NFT layer output tip with the heat-sink material.

7. The HAMR head of claim 6 wherein the thermal shunt has cross-track ends that abut the heat-sink material.

8. The HAMR head of claim 6 wherein the thermal shunt has cross-track ends that overlap the heat-sink material.

9. The HAMR head of claim 6 wherein the thermal shunt has an edge substantially at the recording-layer-facing surface.

10. The HAMR head of claim 1 wherein the NFT layer has cross-track ends that abut the heat-sink material.

11. The HAMR head of claim 1 further comprising a return pole on a surface substantially orthogonal to the recording-layer-facing surface, the return pole being coupled to the main pole and having an end substantially at the recording-layer-facing surface; and wherein the heat-sink material is substantially in contact with the return pole.

12. The HAMR head of claim 1 further comprising a return pole on a surface substantially orthogonal to the recording-layer-facing surface, the return pole being coupled to the main pole and having an end substantially at the recording-layer-facing surface; and further comprising third heat-sink material adjacent the return pole and substantially in contact with the heat-sink material.

13. The HAMR head of claim 1 wherein the heat-sink material at the recording-layer-facing surface form rounded corners.

14. The HAMR head of claim 1 wherein the heat-sink material is recessed from the recording-layer-facing surface.

15. The HAMR head of claim 1 wherein the NFT layer output tip has a generally triangular or trapezoidal shape.

16. The HAMR head of claim 1 wherein the waveguide has a tapered portion that tapers in cross-track width from a region recessed from the recording-layer-facing surface to an end near the recording-layer-facing surface.

17. The HAMR head of claim 1 wherein the heat-sink material adjacent the cross-track sides of the waveguide core comprises second heat-sink material, and further comprising first heat sink material adjacent the cross-track sides of the main pole.

18. The HAMR head of claim 17 wherein the second heat-sink material is substantially in contact with the first heat-sink material.

19. The HAMR head of claim 17 wherein the first and second heat sink material is selected from Cu, Au, Ag, Al, W, Ru, Cr, SiN, AlN, TiC, SiC, Be, Fe, FeCo and NiFe.

20. The HAMR head of claim 17 further comprising a diffusion barrier layer between the first heat sink material and the cross-track sides of the main pole.

21. The HAMR head of claim 1 wherein the heat sink material adjacent the cross-track sides of the waveguide core is selected from Cu, Au, Ag, Al, W, Ru, Cr, SiN, TiC, SiC, Be, Fe, FeCo and NiFe.

22. A heat-assisted recording (HAMR) disk drive comprising:
   the HAMR head of claim 1 further comprising a magnetoresistive read head on the head carrier;
   a laser for directing light to the waveguide; and a magnetic recording disk having a magnetic recording layer.

23. A heat-assisted magnetic recording (HAMR) head for writing to a magnetic recording layer on a magnetic recording disk comprising:
- a gas-bearing slider having a gas-bearing surface (GBS) for facing the magnetic recording layer on the disk, the GBS having an along-the-track axis and a cross-track axis orthogonal to the along-the-track axis;
- a main pole on a surface substantially orthogonal to the GBS and having an output end substantially at the GBS;
- first heat sink material adjacent the cross-track sides of the main pole;
- a near-field transducer (NFT) on the slider oriented substantially parallel to the main pole, the NFT having an output tip at the GBS aligned with the main pole output end in the along-the-track direction;
- an optical waveguide on the slider for optical coupling with the NFT, the waveguide having a length generally orthogonal to the GBS and a tapered portion that tapers in cross-track width from a region recessed from the GBS to an end near the GBS;
- waveguide cladding material adjacent the cross-track sides of the waveguide tapered portion;
- second heat-sink material adjacent the cross-track sides of the waveguide cladding material; and
- a thermal shunt interconnecting the NFT output tip with the first and second heat-sink material.

24. The HAMR head of claim 23 further comprising seed layer material between the waveguide cladding material and the second heat-sink material.

25. The HAMR head of claim 23 further comprising optically reflective material between the waveguide cladding material and the second heat-sink material.

26. The HAMR head of claim 23 wherein the second heat-sink material is substantially in contact with the first heat-sink material.

27. The HAMR head of claim 23 further comprising a return pole on a surface substantially orthogonal to the GBS, the return pole being coupled to the main pole and having an end substantially at the GBS; and wherein the second heat-sink material is substantially in contact with the return pole.

28. A heat-assisted magnetic recording (HAMR) disk drive comprising:
- the HAMR head of claim 27;
- a magnetoresistive read head on the slider;
- a laser for directing light to the waveguide; and
- a magnetic recording disk having a magnetic recording layer.

29. A heat-assisted magnetic recording (HAMR) head for writing to a magnetic recording layer comprising:
- a head carrier having an along-the-track axis and a cross-track axis substantially orthogonal to the along-the-track axis;
- a main pole on a surface substantially orthogonal to the recording-layer-facing surface and having an output end substantially at the recording-layer-facing surface;
- a near-field transducer (NFT) layer on the head carrier oriented substantially parallel to the main pole, the NFT layer having an output tip at the recording-layer-facing surface aligned with the main pole output end in the along-the-track direction;
- an optical waveguide on the head carrier for optical coupling with the NFT layer, the waveguide having a core, a length generally orthogonal to the recording-layer-facing surface and an end facing the recording-layer-facing surface;
- heat-sink material adjacent the cross-track sides of the waveguide core; and
- seed layer material between the waveguide core and the heat-sink material.

* * * * *